United States Patent [19]

Claus et al.

[11] Patent Number: 4,854,706
[45] Date of Patent: Aug. 8, 1989

[54] MODAL DOMAIN OPTICAL FIBER SENSORS

[75] Inventors: Richard O. Claus, Christainsburg; K. D. Bennett, Blacksburg, both of Va.

[73] Assignee: Virginia Tech Intellectual Properties, Inc., Blacksburg, Va.

[21] Appl. No.: 77,931

[22] Filed: Jul. 27, 1987

[51] Int. Cl.[4] .................................................. G01B 9/02
[52] U.S. Cl. ..................................... 356/345; 356/354
[58] Field of Search ................... 356/345, 354; 250/227

[56] References Cited

U.S. PATENT DOCUMENTS

4,339,661 7/1982 Pitt et al. ............................... 250/227
4,525,626 6/1985 Kush et al. ........................... 250/227

*Primary Examiner*—Davis L. Willis
*Assistant Examiner*—Matthew W. Koren
*Attorney, Agent, or Firm*—Mason, Fenwick & Lawrence

[57] ABSTRACT

A modal domain optical fiber sensor for vibration monitoring and as a mechanical motion detector. A laser that focuses coherent light through a lens into one end of a multimode optical fiber. The fiber is secured to a mechanical mechanism for exciting vibrations. The other end of the optical fiber passes its output through a spatial filter and into a photodetector. A variable voltage signal from the photodetector is fed to a monitoring unit, such as an oscilloscope or a microcomputer, for analysis. Of particular significance is the intentional mismatch between the wavelength of the light 18 from the laser and the single mode cut-off wavelength of the glass optical fiber. In a preferred embodiment, the optical fiber has a wavelength of 850 nm and the coherent light has a wavelength of 633 mm.

20 Claims, 5 Drawing Sheets

EMISSION DUE TO COMPOSITE FIBER BREAKAGE

*FIG. 5*

EMISSION DUE TO MATRIX CRACK

MODAL DOMAIN OPTICAL FIBER SENSORS

FIELD OF THE INVENTION

The present invention relates to optical fiber sensors, generally, and to modal domain optical fiber sensors for vibration monitoring and as mechanical motion detectors, in particular.

BACKGROUND OF THE INVENTION

The existence of discrete propagation modes in optical fibers can be both readily explained and observed The theory is derived from the application of boundary conditions to Maxwell's equations for light within an optical waveguide. Important properties of such waveguides include their all-dielectric nature, as well as the fact that they are nearly transparent to a limited band of optical frequencies. Beyond the plethora of theoretical analyses, fiber modes are often ignored, or only considered in that they affect the communication of information. Specifically, intra- and intermodal dispersion have been quantified in terms of the limitations they impose on fiber bandwidth and signal integrity. Also, a phenomenon known as modal noise has been identified as a major hindrance to AM signal transmission in optical fibers.

In addition to communications, optical fibers have received much interest as sensors of a host of mechanical, electrical and chemical parameters. This has led to the proposal and development of many new fiber types and applications with a view towards exploiting them for use in fiber sensors. In particular, consideration of the distance after the injection of light which is necessary to insure equilibrium mode power distribution is seen as applicable to certain sensor types. The mechanisms for coupling of power between modes have also come into focus due to their relevance to fiber sensors.

In a prior art fiber optic sensor, a sensor is coupled to a piece of mechanical equipment. The sensor is an optical waveguide such as a fiber optic cable. The light transmission characteristic of the optical waveguide is altered by the vibration or mechanical force imparted to it from the equipment to which it is coupled.

Two inter-related sensing methods which have their basis in mode phenomena have received some notoriety. The first involves the operation of a fiber such that only a few low order modes are allowed to propagate. Interferometry between these modes is performed to infer disturbances along the length of the fiber. The second method is derived from a multimode fiber output pattern which changes with fiber perturbations.

Optical fibers are often characterized by the amount of signal distortion they display over a given length. This distortion, referred to as dispersion, primarily results in pulse broadening, which thus introduces limits on the fiber bandwidth. Three major mechanisms are identified as contributing to the total dispersion: chromatic dispersion; wavelength dispersion and intermodal dispersion.

The first two types of dispersion are considered intramodal; that is, they affect the light propagating within a particular mode. Chromatic dispersion (alternatively called material dispersion) comes about because glass is a dispersive medium; the different wavelengths of light emitted by an optical source travel at different speeds in the fiber. Depending on the length of the fiber, the different colors will be separated in time, leading to pulse spreading.

On the other hand, waveguide dispersion results because the modal propagation constant $\beta$ is a function of the core radius-wavelength ratio. This effect can usually be ignored for multimode fibers, but can dominate in single mode fibers operating near the zero-chromatic-dispersion wavelength, especially when the fiber demonstrates any significant degree of birefringence.

Figure 1:
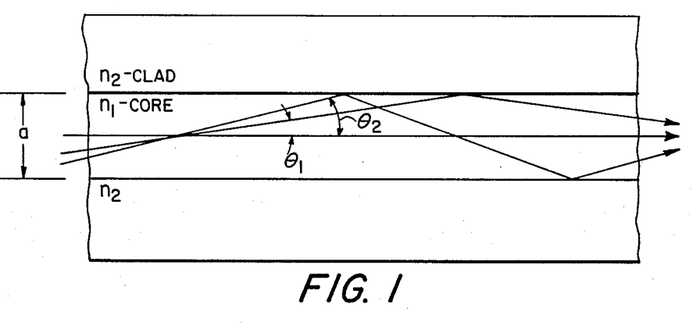
FIG. 1 is a schematic diagram showing the cross-section of an optical fiber and used to explain propagation of modes.

Of more interest is the so-called intermodal dispersion illustrated in the step index ray trace diagram of FIG. 1. Higher order modes, propagating at steeper angles than the lower order modes, actually travel a longer distance in the fiber. Alternatively, the axial group velocity of these high order modes is slower than the velocity of the low order modes. This again leads to a broadening of an input pulse as a function of propagation distance.

In addition to fiber length, intermodal dispersion also depends on the numerical aperture of the fiber, itself a function of the core and cladding indices $n_1$ and $n_2$, the core radius, a, and the light wavelength $\lambda$. Starting with a simple relation between the group delay $t_g$, the length L, the propagation constant and the light frequency :

$$t_g = L \frac{d\beta}{d\omega} \quad (1)$$

an expression can be developed for the modal delay due to both wavelength and waveguide parameters. For a single wavelength, the maximum time delay between modes can be very nearly approximated as:

$$t_{max} = \frac{Ln_1}{c} - n_2\left(1 - \frac{\pi}{V}\right) \quad (2)$$

where c is the speed of light and V is the normalized frequency. By only considering the propagation time difference between the highest and lower order modes, the simple ray trace model yields a reasonable approximation for the intermodal delay in terms of the index difference $\Delta$ :

$$\Delta t_{max} \approx \frac{n_1 L \Delta}{c} \quad (3)$$

In step index multimode fibers, the intermodal dispersion generally predominates the information-carrying capacity (expressed in terms of the bandwidth-distance product). One solution has been to manipulate the waveguide parameters and extend the wavelength so that only a single mode propagates, thereby eliminating intermodal delays. However, the small core sizes and the expense of long wavelength sources required for single mode operation are often prohibitive.

An alternate solution, though not as effective, appeared with the introduction of graded index fibers. Here, the index profile is arranged such that light travelling near the core-cladding boundary actually has a higher velocity than the light near the fiber axis. Rays travelling in a graded index fiber follow a spiraling trajectory where the high order modes round the corners more quickly than in the step index case. This leads to a significantly lower modal time delay and, therefore, increases the bandwidth-distance product.

In most cases, light propagating in optical fibers is eventually converted to a more usable electric signal by means of a photodetector. In addition to the noise created by the detector itself, unwanted electrical fluctuations due solely to changes in the mode propagation constants can be identified. This phenomenon, termed "modal noise", was first isolated and thoroughly investigated by Epworth at the Standard Telecommunications Laboratory in England in 1978.

Figure 2:
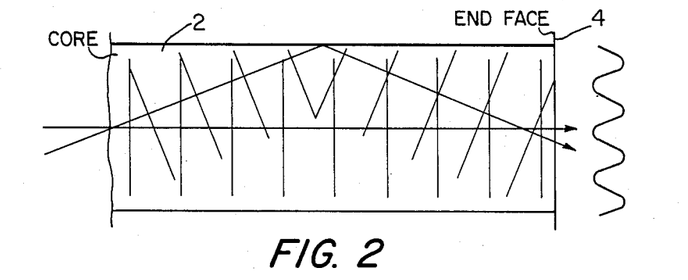
FIG. 2 is a schematic diagram used to explain how speckle patterns arise from the interference between modes.

In order to understand how modal noise occurs, it is first necessary to understand the nature of an optical fiber output pattern, known as a "speckle pattern". As modes travel in a fiber 2, they can be considered as rays, each with its own planar wavefronts, as pictured in FIG. 2. Provided that these modes are coherent along the entire fiber length, they will create an interference pattern at the end face 4. It is important to realize that any two modes will create a type of fringe pattern, and that if either changes its propagation characteristics, the entire fringe pattern will shift. Furthermore, on the end face, the fringe, or speckle, will measure about half the fringe spacing, approximately $\lambda/2(NA)$, where NA is the fiber numerical aperture.

In practice, many more than two modes usually propagate, and the output pattern is generally imaged some distance from the fiber end. The result is a complex collection of light and dark spots of varying shape, intensity and polarization, arising from the multiple superposition of many wavefronts. These speckles are all interlinked and their spatial intensity distribution depends on the exact propagation features of the modes. These features include anything which affects $\beta$, such as the input wavelength, the injected power distribution, and the local refractive index and waveguide geometry.

Theoretically, the number of speckles which add together can be approximated by:

$$S = \pi \left[ \frac{2a(NA)}{\lambda} \right]^2 \quad (4)$$

Although this expression is nearly identical to that for the number of modes in a step index fiber, it is important to bear in mind that the speckles are not the modes, but rather, the result of interference between the modes. The value in this relation is that it gives guidelines for increasing or decreasing the number of speckles, as desired for certain applications.

In order for interferences to occur, it was assumed in the foregoing discussion that the modes were mutually coherent. In a laboratory where only gas lasers are used, this is easily achieved since the coherence length of an average gas laser is often hundreds of meters. In the standard communications-grade semiconductor laser, the coherence length could exceed tens of meters. When the path length difference between two modes exceeds the coherence length, these modes will no longer interfere, but will merely add in their intensity distribution. This means that the speckle pattern will tend to defocus with increasing length along a given fiber. For most laser sources and fibers, however, total blurring of the speckle pattern is unlikely since neighboring modes remain coherent for relatively long distances. Note, in contrast, that LEDs are nearly incoherent sources to begin with; fibers illuminated by LEDs generally show no speckle. Rather, their output pattern is a smooth Gaussian-like intensity distribution.

Several mechanisms can create modal noise. The mechanisms which are most important to sensor work are changes in local fiber geometry, which in turn, alter propagation constants. These changes result from any small perturbations of the fibers, thus dimension) variations. All of these effects lead to amplitude modulation of the detected light. This would clearly be considered as noise in the context of analog optical signals.

Three major cures have been identified for modal noise, all affecting rather different domains of optical communications. The first most obvious solution is to use single mode fibers. This eliminates speckle altogether since there are not two or more modes to interfere with one another. Single mode operation is also attractive from the point of view that increased bandwidth capabilities and/or longer distances can be spanned. Some drawbacks occur however in that a single mode fiber is more difficult to handle owing to its small size, is more expensive and necessitates the use of laser diodes—themselves expensive and requiring complex driving circuitry. Also, single mode fibers usually show some degree of birefringence. When light passes any place in the fiber link which is polarization selective, what is known as polarization, modal noise occurs.

Another approach to reducing modal noise is to transmit purely digital signals. Thus, if high and low levels are set beyond the maximum amplitude of the noise signal, the unwanted AM component is lost. This has been done in practice for other reasons besides just avoiding modal noise. Still another scheme is to simply use a highly multimode laser; that is, one which shares its output power among many cavity modes. In addition to being unrelated to one another, the laser modes produce spectral lines of reduced coherence length. Other techniques basically attempt to cause a single mode laser to behave as multimode, for instance, by encouraging frequency dithering through the application of a radio frequency bias to the laser.

It is usually true that the very phenomena which the communications engineer finds most troublesome are the same phenomena which are exploited by those interested in developing fiber optic sensors. The classic case in point involves microbends occurring in fiber cables, both residually and after it has been laid. Microbending causes signal loss or attenuation and thereby limits the reliable transmission length of a fiber.

Strictly speaking, bend loss sensors are not considered modal sensors since the phenomena they measure appear as amplitude changes in the detected signal. We have seen, however, that periodic fiber deformers can actually be viewed as causing mode redistribution and since some of the modes escape the fiber, they lead to intensity loss. This differs from the sensors conventionally classified as modal domain, in that the latter generally do not depend on an average power loss in order to derive a sensor signal One of the first truly mode-dependent sensors was developed at the U.S. Naval Research Laboratory around 1978. At the Naval Laboratory, the phase difference between any two modes in a step index fiber due to acoustically induced pressure variations was derived. Around the same time the dual mode sensor was being developed, researchers in England were investigating a similar device based on multimode propagation. The device called the "Fiberdyne" operates on the principle that optical fibers exhibit the property of self-homodyning, that is, that disturbances in the fiber induce a modulation of the multiple interference speckle pattern.

The Fiberdyne method has been used both in sensor configurations and as a transmission technique. In the first case, fiber carrying coherent light is usually subjected to some mechanical disturbance to be measured, such as an acoustic field. When the output is imaged onto a photodetector, an AM component in the output signal results. This is explained, as before, by noting that no system is entirely free from points of speckle selective loss.

From the above discussion, it should be apparent that Fiberdyne sensors are best suited to measuring time-varying quantities, since it is changes in the speckle pattern that causes changes in the detected amplitude. Furthermore, low frequency variations, while possible to detect, present difficulty due to deep signal fades. These result from environmental condition changes which cause small fiber expansions or contractions, or worse yet, which affect the light source operating conditions. The modal distribution is in turn rearranged, albeit, only slightly, resulting in a moving interference pattern. However, these fades can be at least partially overcome by forcing them to go through their full cycle at twice the expected data frequency or higher. The resulting signal is sampled and low pass filtered to obtain the signal of interest.

Specific sensor applications based on this method have been considered. The first to appear consisted of a fiber wrapped around a piezoelectric cylinder. When a voltage was applied, the cylinder and thus the fiber deformed; the motion was electrically detected at a photodiode and acoustic disturbance was monitored.

Another device was constructed for the purpose of measuring fluid flow. A fiber carrying coherent light was placed within a copper tube through which the fluid ran. The inevitable turbulence in the flow was detectable by monitoring the speckle output. It was discovered that the turbulence frequency was related to the flow velocity, giving the device the characteristics of a reasonably, accurate flow meter.

Current sensing has also been performed using the Fiberdyne technique. A metal coated optical fiber was placed in a permanent magnetic field. When an a.c. current was passed through the metal coating, the fiber in the magnetic field deformed in proportion to the current amplitude. By spatially filtering the speckle pattern and detecting with an amplifier tuned to the a.c. frequency, a repeatable, logarithmic correlation with the current level was obtained More recently, the Fiberdyne method has been applied to the analysis of vibrations in composite material structures. Optical fibers are attached to bars or panels and the structures are set in motion with some forcing function. With a knowledge of both the fiber layout on the panel and the constraints on the panel, the bending modes of the panel can be directly obtained from the spectrum of the light detector output. Again, spatially filtering the speckle pattern and electronically filtering the detector signal can significantly increase the signal to noise ratio.

Two other mode-related phenomena have also been considered. The first is a method for measuring the bandwidth of optical fibers based on their speckle patterns. A frequency correlation function relating the spatial distributions of speckles at two deferent optical wavelengths with the fiber bandwidth has been defined. The second is mode division multiplexing (MDM). Under this phenomena two different tubular modes in conventional graded index multimode fiber are launched and detected. MDM was originally conceived as an alternate or addition to frequency and wavelength division multiplexing.

U.S. Pat. No. 4,191,470 (Butter) relates to a laser-fiber optic interferometric strain gauge. A laser provides an input into two single-mode optical fibers. Interference takes place between the outputs of the two fibers rather than within a single multimode fiber. U.S. Pat. No. 4,525,626 (Kush et al) is directed to a fiber optic vibration modal sensor which makes use of a single multi-mode optical fiber positioned within or on a structure for which vibration measurements are to be detected. U.S. Pat. No. 4,408,495 (Couch et al) is another example of a fiber optic system for measuring mechanical motion or vibration of a body. This patent appears to be concerned with creating an optical waveguide that is bent beyond the critical angle at which the light directed through the waveguide is substantially, totally, internally reflected along the waveguide. U.S. Pat. No. 4,420,251 (James et al) is another example of a prior art optical deformation sensor. U.S. Pat. Nos. 4,421,979 (Asawa et al) and 4,477,725 (Asawa et al) are directed to optical fiber sensors which employ micro-bending for remote measurement of forces such as stress at several locations along a pre-determined length. U.S. Pat. No. 4,269,506 (Johnson et al) is of interest in that it discusses the influence of physical parameters on the length of a path of an electrically stretchable optical fiber. Finally, U.S. Pat. Nos. 4,295,738 (Meltz et al) and 4,342,907 (Macedo et al) are examples of optical fiber sensing devices.

Despite these advances, there is still a need for a highly reliable modal domain optical fiber sensor for detecting parameters such as strain. The present invention is directed toward filling that need.

SUMMARY OF THE INVENTION

The present invention relates to modal domain optical fiber sensors for vibration monitoring or as mechanical motion detectors.

Generally, a modal domain optical fiber sensor incorporating the teachings of the subject invention includes a light source such as a helium-neon laser which introduces a coherent beam of light into the input of a multi-mode optical fiber after passing through an objective lens. The proper orientation of the fiber end relative to the laser beam is insured through a fiber positioner such as a clamping device.

The optical fiber is secured in some fashion to a mechanical system which imparts mechanical stresses and disturbances to the optical fiber. As will be explained in greater detail hereinafter, preferred embodiments of the subject invention include mechanical systems where the optical fibers are embedded in or secured onto a structure, secured to a vibrating string and secured to a cantilevered beam.

From the mechanical system, the optical fiber terminates in an end portion which projects the laser beam onto a spatial filter in order to selectively transmit a portion of the laser beam to a photodetector. The varying voltage produced by the photodetector is passed to a display device such as a digital storage oscilloscope and/or to a computer system such as a microcomputer where the digital data is stored for subsequent analysis.

In all embodiments of the subject invention, a critical feature is the intentional mismatch between the wavelength of the laser beam and the single mode cut-off operating wavelength of the optical fiber.

It is a primary object of the present invention to provide a modal domain optical fiber sensor capable of being used to measure different mechanical and electrical quantities.

It is another object of the present invention to provide a modal domain optical fiber sensor for vibration monitoring.

It is still another object of the present invention to provide a modal domain optical fiber sensor for mechanical motion detection.

These and other objects and advantages will become apparent when viewed in light of the following description and appended drawings.

DETAILED DESCRIPTION OF THE PREFERRED EMBODIMENTS

Figure 3:
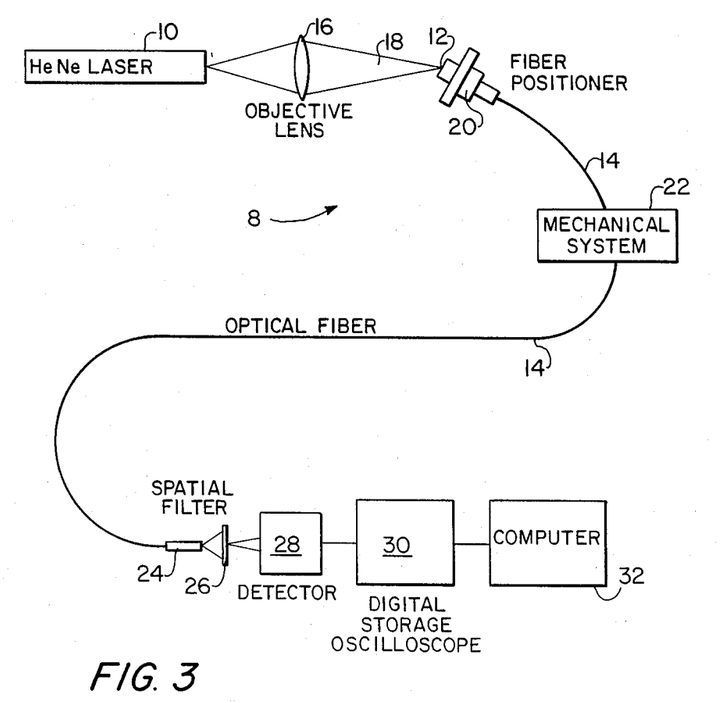
FIG. 3 is a schematic diagram showing an optical fiber sensor incorporating the teachings of the subject invention.
Figure 12A:
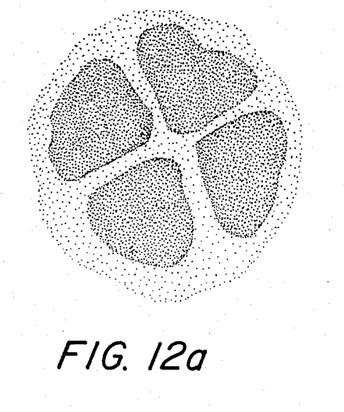
FIGS. 12a and 12b are speckle patterns resulting from modal senor systems having different ratios between single mode cut-off wavelength and laser wavelength.

The present invention relates to optical fibers sensors, generally, and to modal domain optical fibers sensors, in particular. With reference to FIG. 3, the invention primarily is directed to a modal domain sensor 8 using a laser 10 that focuses coherent light 18 through an objective lens 16 into one end 12 of a multimode optical fiber 14. The fiber is secured to a mechanical mechanism 22 for exciting vibrations. The other end 24 of the optical fiber 14 passes its output through a spatial filter 26 and into a photo detector 28. A variable voltage signal from the photodetector 30 is fed on line 29 to a monitoring unit, such as an cscilloscope 30 or a microcomputer 32, for analysis. Of particular significance to the present invention is the intentional mismatch between the wavelength of the coherent beam of light 18 from the laser and the single mode cut-off wavelength of the glass optical fiber 14. In a preferred embodiment, the optical fiber has a single mode cut-off wavelength of 850 nm and the coherent light has a wavelength of 633 nm. The mismatch between the wavelength of the laser light and the single mode cut-off wavelength of the optical fiber determines how many modes are created and propagate within the fiber. If the laser light wavelength is less than the fiber cut-off wavelength, then more than one mode will be created within the fiber and a several lobe speckle pattern will result at the output. An example of such a speckle pattern is shown in FIG. 12a. If the laser light wavelength is much less than the fiber cut-off wavelength, then many modes will propagate in the fiber and the output speckle pattern will have many individual speckles, sucha s shown in FIG. 12b.

Figure 12B:
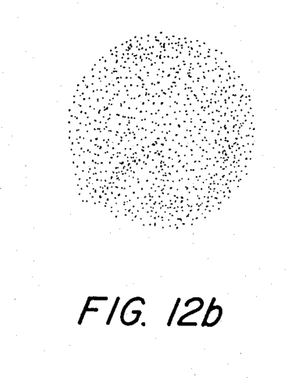

FIG. 12b shows a speckle pattern for a modal sensor system in which the ratio between the single mode cut-off wavelength of the fiber and the laser wavelength is large. A large number of individual speckles are observed in the output pattern. FIG. 12a, on the other hand, shows the speckle pattern that may be obtained for a modal domain sensor system in which this ratio is small. In this case the V-number is about 4 and the number of individual speckle pattern lobes is small.

Before getting into a detailed discussion of several of the preferred embodiments, an introduction to the way in which discrete propagation modes are created in optical fibers is first presented. Fiber mode field descriptions are derived by applying the appropriate boundary conditions to electromagnetic fields which satisfy Maxwell's equations for light in an optical waveguide. For simplicity, modes travelling in such a guide can be considered as rays, each with its own set of parallel wavefront surfaces. If these modes are coherent along the entire length of the fiber they will combine to form an optical interference fringe pattern in the plane of the end face of the fiber. It should be remembered that any two modes will create a particular type of fringe pattern and that if either of the modes changes its propagation characteristics, the entire fringe pattern will shift. Additionally, on the end face of the fiber the fringe spacing d is given by:

$$d = \frac{\lambda}{2(NA)} \quad (5)$$

Here, is the wavelength of the light in the fiber and NA, the numerical aperture of the fiber, is a measure of the geometrical input and output property of the fiber. Analytically:

$$NA = n \sin\theta \quad (6)$$

where n is the index of refraction of the material, usually air, which surrounds the end of the fiber and 0 is half the planar angle which described the cone of acceptance of bound core modes.

In multimode fibers, mary more than two modes usually are supported. The output pattern in the far field from the output end of the fiber is then due to the interference of individual contributions from each of the modes. This pattern, termed a "speckle pattern", is a complicated collection of bright and dark spots having different shapes, intensities and polarizations. The speckles are all interlinked and their spatial distribution depends upon the absolute and differential propagation characteristics of the modes. The modes of the fiber, and thus the spatial distribution, may be changed by perturbing the input wavelength, the spatial distribution of power at the input to the fiber or the exact geometry of the fiber.

The number of speckles S which add together to form the total pattern may be approximated by:

$$S \alpha \pi \left[ \frac{2a(NA)}{\lambda} \right]^2 \qquad (7)$$

where a is the radius of the core of the fiber. Although this expression is nearly identical to that for the number of modes n a step index fiber, it is important to note that a one-to-one correspondence between the speckles and the modes does not exist, rather, the speckles are the result of interference between the modes. The value of this relation is that it suggests that a decrease in the number of modes will produce a less complicated speckle pattern. The modal domain technique incorporated into the present invention takes advantage of this directly in that it uses the simplest multimode speckle pattern available to sense environment-induced mode-mode interactions.

With this understanding of the way in which discrete propagation modes exist in optical fibers, a discussion of modal domain sensing principles is now provided.

The dependence of the speckle pattern on fiber geometry can be exploited as a sensitive measure of physical perturbations along the length of the fiber. For example, if the transmitted light in a fiber system propagates through a region in which the modes are not uniformly attenuated, modal changes due to fiber geometry changes will result in an amplitude modulation of the intensity of one output pattern speckle. Such regions often occur in fiber communication lines and seriously limit the ability of multimode fibers to transmit analog data. In communications applications, this phenomenon is known as modal noise, while in sensor systems it is referred to as the Fiberdyne effect (fiber optics self-homodyne).

The basis of modal domain sensing thus lies in the ability to produce non-uniform modal attenuation in a multimode fiber in response to the physical phenomenon to be sensed. If such a fiber is attached to a vibrating structure, for example, the fiber experiences such non-uniform attenuation due to two effects. First, the fiber experiences bending due to the vibration. Bends in a fiber cause power transfer between optical modes as well as the loss of power from some modes to "radiation" modes which effectively carry power out of the fiber. Since bends with different radii produce optimal coupling between different pairs of modes, an analysis of the speckle pattern at the output in principle yields a measure cf the amplitude of each spatial Fourier component of the vibration-induced bend pattern. For small deformations, the mode-mode interactions are approximately linear. As a result, the amplitude of a particular vibrational "mode shape" coefficient is proportional to the amplitude of the corresponding temporal frequency component coefficient of the intensity of the speckle pattern.

FIG. 3 is a schematic diagram of a generalized modal domain optical fiber sensor incorporating the teachings of the subject invention. A coherent beam of light from a light source such as a helium neon laser 10 is introduced into the input 12 of a multimode optical fiber 14 after passing through an objective lens 16. The proper orientation of the fiber end 12 relative to the laser beam 18 is insured through a fiber positioner 20 which may be any one of the well-known clamping devices used for this purpose.

Optical fiber 14 is secured in some fashion to a mechanical system 22 which imparts mechanical stresses and disturbances to the optical fiber. As will be explained in greater detail hereinafter, preferred embodiments of the subject invention include mechanical systems where the optical fibers are embedded in or secured onto a structure, secured to a vibrating string and secured to a cantilevered beam.

From mechanical system 22, optical fiber 14 terminates in an end portion 24 which projects the laser beam onto a spatial filter 26 in order to selectively transmit a portion of the laser beam to a photodetector 28. Portion 24 in FIG. 3 is a device for holding the output end of the fiber. Usually a tube with a small diameter hole in it to hold the fiber is used. The fiber is inserted into the tube and the tube is held in a clamp. The varying voltage produced by the photodetector 28 is passed to a display device such as a digital storage oscilloscope 30 and/or to a computer system such as a microcomputer 32 where the digital data is stored for subsequent analysis.

In all embodiments of the subject invention, a critical feature is the intentional mismatch between the wavelength of the laser beam 18 and the single mode cut-off wavelength of the optical fiber. It is contemplated that the wavelength range for the laser beam is from about 400 nm to 1600 nm and the wavelength range for the optical fiber is from about 440 nm to 2000 nm. Within these ranges, the wavelength of the optical fiber is related to the wavelength of the laser beam in a ratio of from about 1.1 to 5.0.

Figures 4, 7A, 7B:
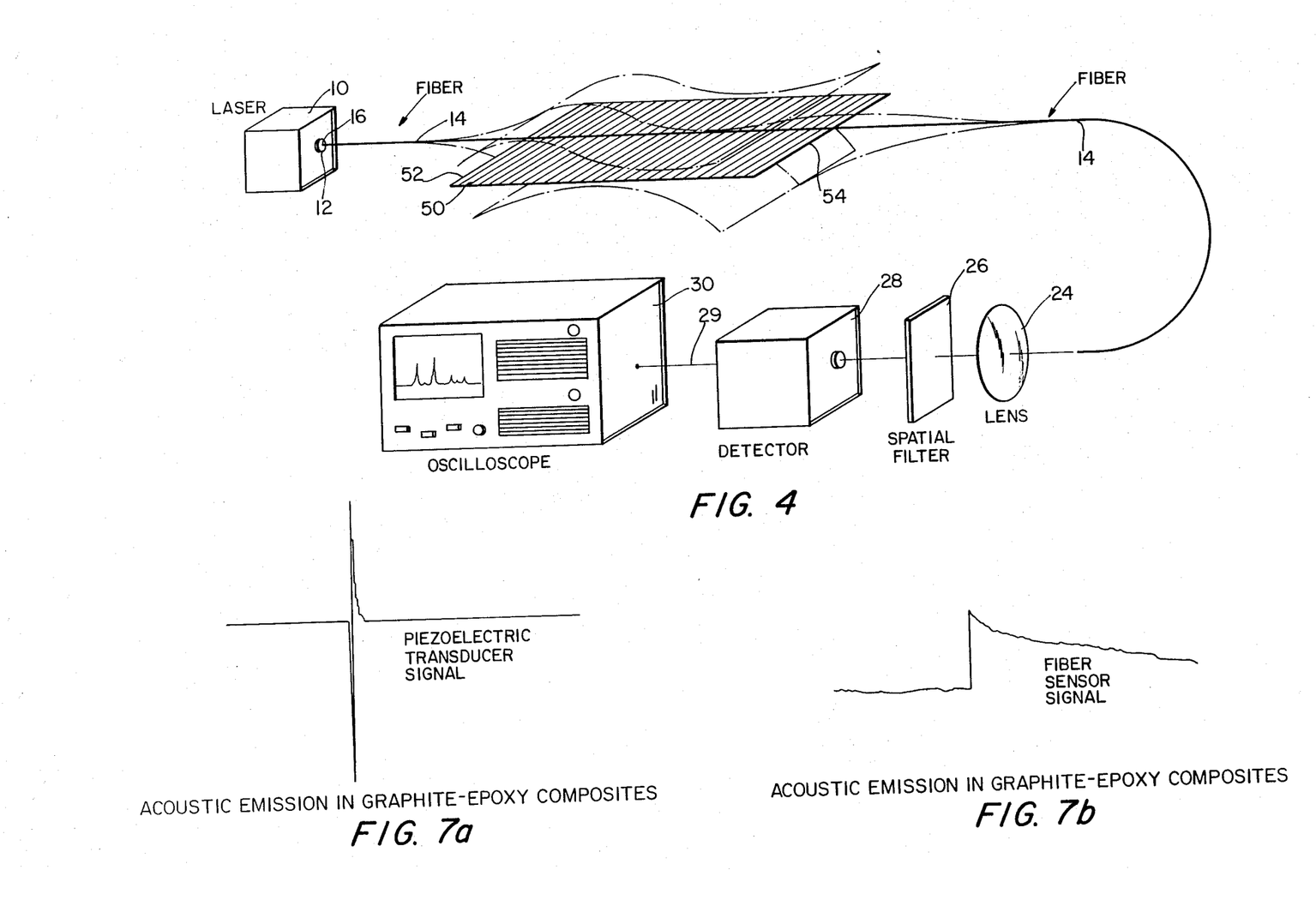
FIG. 4 is a schematic diagram of another embodiment of a system incorporating the teachings of the subject invention.
FIGS. 5, 6, 7a and 7b are graphs used to explain the operation and characteristics of the subject invention.

FIG. 4 schematically illustrates an embodiment of the invention where an optical fiber 14 has been embedded in a cross-ply graphite-epoxy composite structure 50. The sensor shown in FIG. 4 is essentially the same as the sensor 8 of FIG. 1 with the exception that mechanical system 22 is constituted by composite structure 50. The movement of the composite structure and the embedded optical fiber are shown in phantom. The crossply graphite-epoxy composite structure consists of eight 1.02 mm plies that were laid up by hand using prepreg tapes. Each ply measured 25.4×2.54 cm and were arranged in symmetric cross-ply fashion. The optical fiber 14 had core/clad diameters of 8/125 microns with $V=4$, where V is the normalized frequency as discussed above, and an 850 nm cut-off wavelength. The optical fiber was embedded between the two center plies in the 8-ply symmetric cross-ply composite structure and cured in a standard heated-platen press. The edges 52 and 54 from which fiber 14 emerged were insulated with paper during cure to reduce the embrittlement of the adjacent fiber coating and protective quick-cure polymer tabs were applied to the fiber-matrix joints soon after cure to minimize fiber breakage.

The helium-neon laser 10 produced a coherent light 18 of 633 nm wavelength which was injected into the glass optical fiber 14 with an 850 nm cut-off wavelength. At the output 24 of the fiber 14, the speckle pattern produced by the mutual interference between the far-field distributions of the four propagating core modes (FIG. 12a) was spatially filtered and detected.

When the optical fiber 14 is mechanically perturbed, the individual mode contributions to the far-field intensity function change, the speckle pattern shifts and the detected signal varies. For slowly varying loads, a simple model of phase modulation may be used to demonstrate the sensitivity of the fiber 14 to different strain components. For example, if temperature variations are neglected, the total phase change produced by stress alone may be written in general for a single-mode step-index fiber such as:

$$\Delta\phi = \frac{2\pi L}{\lambda} \left\{ \epsilon_1 - \frac{n^2}{2}(P_{11} + P_{12})\epsilon_r + P_{12}\epsilon_1 \right\} \quad (8)$$

where L is the length of the sensing section of the fiber, is the optical figure wavelength, $\epsilon_1$ and $\epsilon_r$ are the longitudinal and radial strain, respectively, n is the core index and $P_{11}$ and $P_{12}$ are the photoelastic constants of the silica fiber. For a multimode fiber, the phase of each mode varies in a slightly different way so that total output speckle pattern is complicated, especially if the number of modes in the fiber is large.

The behavior of the phase of a single mode is an appropriate model for the instantaneous modulation produced by an acoustic wave with a wavelength much larger than the fiber diameter. The different acoustic wavelengths of the event not only modulate the fiber differently but also drive plate mode vibrations of the composite which also contribute to the fiber modulation.

The composite structure 50 was tested by being axially loaded in a conventional computer-controlled load frame using special grips designed to securely hold the specimen without cracking the embedded optical fiber 14. One such load frame is manufactured by J.J. Lloyd Instruments and is known as Model T20,000. As the structure loaded, the optical fiber sensor output was monitored using a self-triggerable digital storage oscilloscope 30. The oscilloscope recorded burst events at the same times that audible acoustic events were noted, as well as smaller amplitude events which were inaudible. In all, four structures were tested and each failed at about 65,000 pounds of load and before the internal optical fiber 14 failed due to load. The importance of these tests is that they demonstrate one possible embodiment of the invention. Acoustic emission events created in composite specimens as described here consist of high frequency waves which cause localized and rapid vibrations of the specimens. Using the modal domain sensing method, a rapid vibration is detected. These vibrations are substantially different from the type of vibrations associated with a vibrating cantilever beam or vibrating string in that their frequencies are more than ten times higher.

Figure 5:
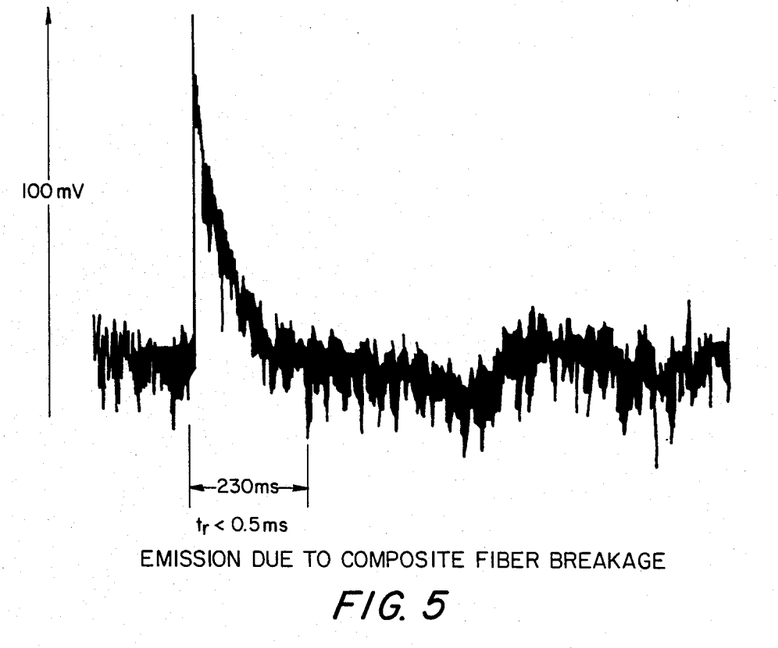
Figure 6:
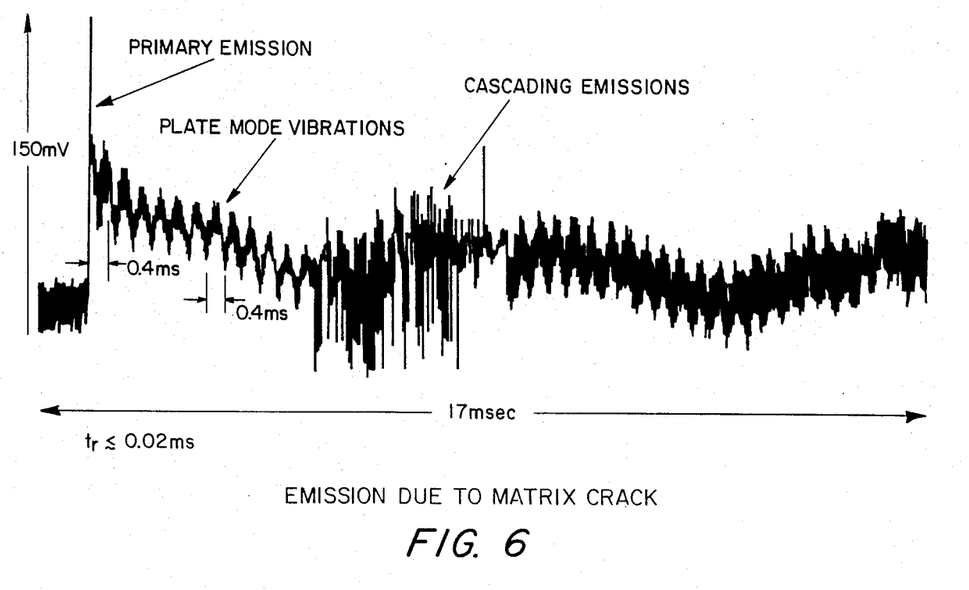

Typical events recorded for the same composite structure 50 at different times during loading are shown in FIGS. 5 and 6. FIG. 5 shows emission in mV over time due to composite fiber breakage and FIG. 6 shows emission in mV over time due to matrix crack. Analysis of this data indicates that the acoustic emission event in FIG. 6 is due to the cracking of the composite matrix material. This is evidenced by the fast initial rise time of less than 20 microseconds, a primary emission followed by induced plate mode vibrations and cascading emissions related to subsequent strain release. The very different signature shown in FIG. 5 is typical of an event caused by graphite fiber breakage in that it consists of a single relatively long duration pulse of slow rise time and does not exhibit following events.

Events recorded simultaneously using both the optical fiber and conventional "acoustic emission" piezoelectric transducers were also compared. The piezoelectric transducer was attached to the structure 50 in the center of one side, directly above the embedded fiber 14. Typical comparison data is shown in FIG. 7.

It is well known that failure of the matrix material as well as the graphite fibers occurs in graphite-epoxy composites under tensile loads. This releases acoustic energy as acoustic emissions (AE). An acoustic emission is a release of a burst of bonding energy which propagates as a stress wave in the sample. Thus, the embodiment of FIG. 4 becomes a convenient stress wave generator. It is further to be understood that the optical fiber could be embedded in other materials such as wood, plastic or concrete, and still operate as a stress generator.

The coherent light 18 of 633 nm wavelength injected into the fiber produces a speckle pattern monitored at the output 24. To observe mode-mode interference, the speckle pattern is spatially filtered such that a small part of the pattern fell on the photodetector 28. It was found by experience that it is best to select a small region on the edge of one of the large speckles for such detection.

Figure 8:
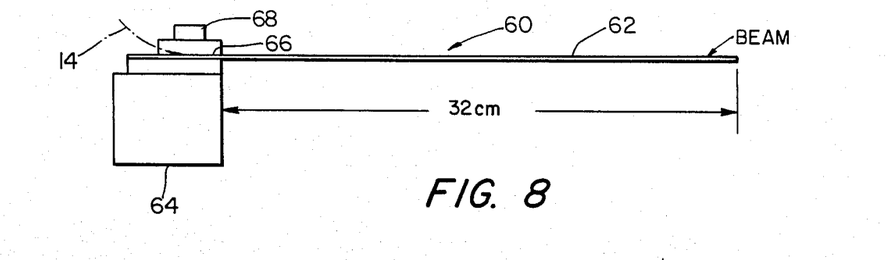
FIG. 8 is a side-view of a cantilevered optical fiber sensor for use in practicing the subject invention.
Figure 9:
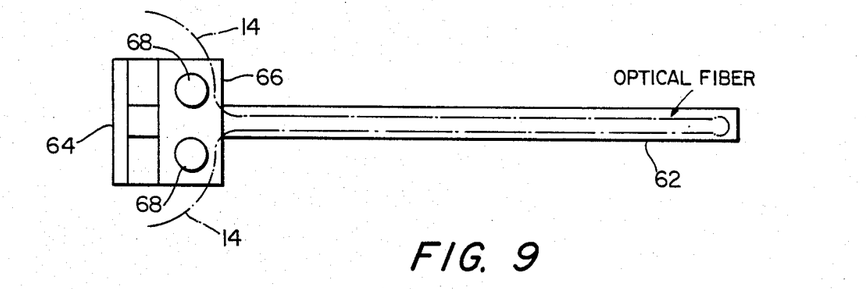
FIG. 9 is a top view of the cantilever beam of FIG. 7.

In yet another embodiment of the subject invention, the mechanical system 22 of FIG. 1 implemented a cantilever beam 60 schematically shown in FIGS. 8 and 9.

The cantilever (clamped-free) beam 60 consists of an elongated piece of tempered steel 62, one end of which is secured to a fixed location 64 by a clamp 66 and fasteners 68. The beam 60 are 4-ply, symmetric cross-ply, 25.4×10.16 cm steel composites. A multimode fiber 14 was embedded in an elongated loop between the center two plies. The fiber had a core/clad diameter of 50/125 and a numerical aperture of 0.2 NA. As expected, the speckle pattern had numerous small speckles and the placement of the detector was not as critical as the few-mode fiber and coupling efficiency was higher because of the larger core and NA. It is more practical to use multi-mode fiber to develop sensors for ease of design and production.

Figure 10:
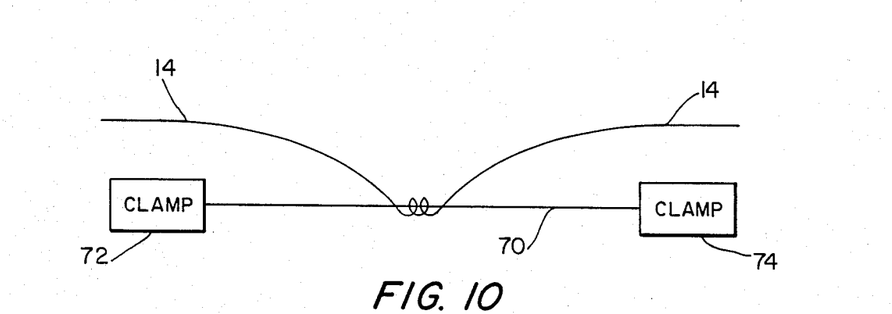
FIG. 10 is a schematic view of an optical fiber being used in conjunction with a vibrating string as the mechanical system.

In still another embodiment of the subject invention, the mechanical system 22 is implemented through a vibrating string 70. As shown in FIG. 10, an optical fiber 14 with a single mode cut-off wavelength near 1300 nm was wrapped twice around a string 70 clamped at both ends by clamps 72 and 74, and axially loaded so it had a fundamental vibrational frequency near 120 Hz. The fiber was illuminated with coherent light 18 with a wavelength of 633 nm, producing four propagating modes in the fiber and a four-lobed speckle pattern at the output. A pinhole spatial filter 26 was used to transmit only one of these lobes to the optical detector.

It is well known that the periodic vibration function of a string under tension, call it f(t) with period T, may be represented by a Fourier sum of the form:

$$f(t) = 1/2\, a_o + \sum_{n=1}^{\infty} (a_n\cos(n\omega_o t) + b_n\sin(n\omega_o t)) \quad (9)$$

where the Fourier coefficients are determined by their respective integral expressions. The dr off-set and harmonic content of f(t) are determined by the various $a_n$ and $b_n$ terms. For a string of fixed length, the fundamental vibration frequency will remain constant, regardless of the manner of excitation. However, variations in the initial string geometry, due to different excitation methods, will lead to variations in the harmonic content. This is discerned audibly by differences in timbre or tone quality.

The oscillations from the amplified photodetector signal 29 of FIG. 1 were displayed on the digital storage oscilloscope 30 and subsequently read into the computer 32 for analysis. The computer first calculates the Fourier coefficients up to a requested number of harmonics and then uses them to generate a waveform approximating the input. The results of the two excitation cases above are described.

Figure 11A:
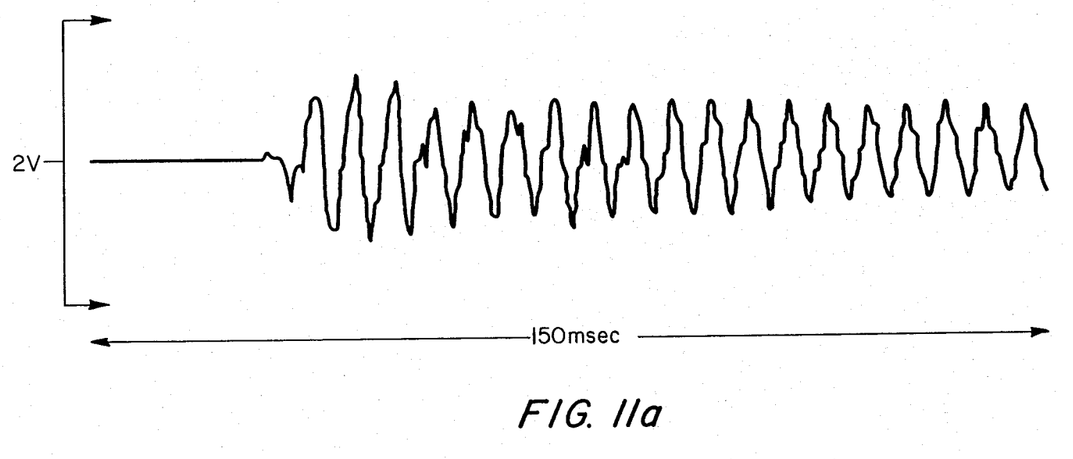
FIGS. 11a and 11b are sets of graphs used to explain the operating characteristics of the embodiment of FIG. 9.
Figure 11B:
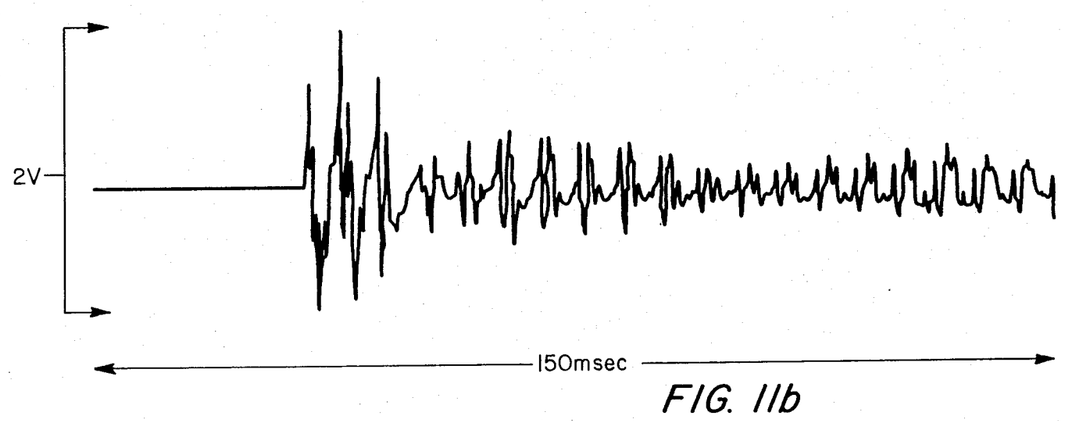

The output of the fiber sensor is shown in FIG. 11 for the first 150 msec of vibration; the electronic filter had 3 dB points at 100 and 1000 Hz. Curve A resulted from excitation near the midpoint of the string 70; Curve B resulted from excitation near one support 74.

Waveform B dies out faster and is more jagged, indicating the presence of additional high harmonics. For each signal the fundamental period was 8.25 msec and, for each, a single segment of the time varying pattern was chosen near the 100 msec point for Fourier analysis. The normalized harmonic content shown in FIG. 10 confirms that the energy in Curve A above is indeed concentrated at the fundamental, while the energy in Curve B is spread among more modes. It may be noted that although the amplitudes of only 15 harmonics are shown, they were computed for 50 harmonics. The resulting Fourier reconstructions approximated the stored waveforms.

Many changes and modifications in the above embodiments of the invention can be made without departing from the scope of the invention. Accordingly, the scope is intended to be limited only by the appended claims.

What is claimed is:

1. A modal domain optical fiber sensor for detecting movements of a mechanical system, said sensor comprising:
   (a) laser means for producing a coherent beam of light having a first wavelength;
   (b) an optical fiber having a single mode cut-off at a second wavelength, said second wavelength being greater than said first wavelength;
   (c) means for directing said beam of light into one end of said optical fiber;
   (d) means for securing a portion of said optical fiber to said mechanical system for moving said portion in response to movement of said mechanical system;
   (e) detecting means for detecting a portion of a speckle pattern created at the other end of said optical fiber as said beam emerges from said other end, said first and second wavelengths being chosen so that said speckle pattern has a plurality of lobes, the position of said speckle pattern changing in response to the movement of said portion of said optical fiber; and
   (f) means for filtering said speckle pattern so that said portion of said speckle pattern constitutes one of said lobes.

2. The modal domain sensor of claim 1, wherein said first wavelength is approximately equal to 633 nm.

3. The modal domain sensor of claim 2, wherein said second wavelength is 850 nm.

4. The modal domain sensor of claim 2, wherein said second wavelength is 1300 nm.

5. The modal domain sensor of claim 1, wherein said filtering means comprises a pinhole spatial filter interposed between said other end of said optical fiber and said detecting means.

6. The modal domain sensor of claim 5, wherein said detecting means comprises a photodetector.

7. The modal domain sensor of claim 1, wherein said plurality of lobes is four lobes.

8. The modal domain sensor of claim 1, wherein said first and second wavelengths are chosen so that said optical fiber includes two modes for creating said speckle pattern with a plurality of lobes.

9. The modal domain sensor of claim 1, wherein said laser means is a helium-neon laser.

10. The modal domain sensor of claim 1, wherein said means for securing said optical fiber to said mechanical system is a glue for fastening said fiber to a surface of said mechanical system.

11. The modal domain sensor of claim 1, wherein said means for securing said optical fiber to said mechanical system is an opening for embedding said fiber within said mechanical system.

12. The modal domain sensor of claim 1, further comprising means for producing an electrical signal representative of th portion of the speckle pattern detected by said detecting means; and means for converting said electrical signal into eye-readable form.

13. The modal domain sensor of claim 12 wherein said converting means is an oscilloscope.

14. The modal domain sensor of claim 1, wherein a mismatch ratio between said first and second wavelengths is in the range from about 1.1 to about 5.0.

15. The modal domain sensor of claim 14, wherein said first wavelength is in the range of from about 400 nm to about 1600 nm.

16. The modal domain sensor of claim 14, wherein said second wavelength is in the range of from about 440 nm to about 2000 nm.

17. An apparatus for measuring the force acting on a mechanical system that moves relative to a fixed reference point, said apparatus comprising:
   (a) laser means for producing a coherent beam of light having a first wavelength;
   (b) an optical fiber having a cut-off at a second wavelength, said second wavelength being greater than said first wavelength;
   (c) means for directing said beam of light into one end of said optical fiber;
   (d) means for securing a portion of said optical fiber to said mechanical system for moving said portion in response to movement of said mechanical system;
   (e) detecting means for detecting a portion of a speckle pattern created at the other end of said optical fiber as said beam emerges from said other end, said first and second wavelengths being chosen so that said speckle pattern has a plurality of lobes, the position of said speckle pattern changing in response to the movement of said portion of said optical fiber and
   (f) means for filtering said speckle pattern so that said portion of said speckle pattern constitutes one of said lobes.

18. The apparatus of claim 17, wherein said first wavelength is approximately equal to 633 nm.

19. The apparatus of claim 18, wherein said second wavelength is 850 nm.

20. The apparatus of claim 17, wherein said first and second wavelengths are chosen so that said optical fiber includes two modes for creating said speckle pattern with a plurality of lobes.

* * * * *